Sept. 19, 1939. K. E. PRINDLE 2,173,726

INSULATING MATERIAL

Filed Jan. 5, 1938

INVENTOR.
KARL E. PRINDLE
BY Wm. S. Pritchard
ATTORNEY.

Patented Sept. 19, 1939

2,173,726

UNITED STATES PATENT OFFICE 2,173,726

INSULATING MATERIAL

Karl E. Prindle, Shaker Heights, Ohio, assignor to The Dobeckmun Company, Cleveland, Ohio, a corporation of Ohio Application January 5, 1938, Serial No. 183,410

6 Claims. (Cl. 171—206)

This invention relates to the art of insulating electrical equipment. More particularly, this invention relates to an electrical motor and specifically to insulating the windings from the armature core and the stator coils (and the exciter coils when used) from the stator core.

The nature and objects of the instant invention will become apparent from the following description, appended claims, and accompanying drawing wherein:

Figure 1:
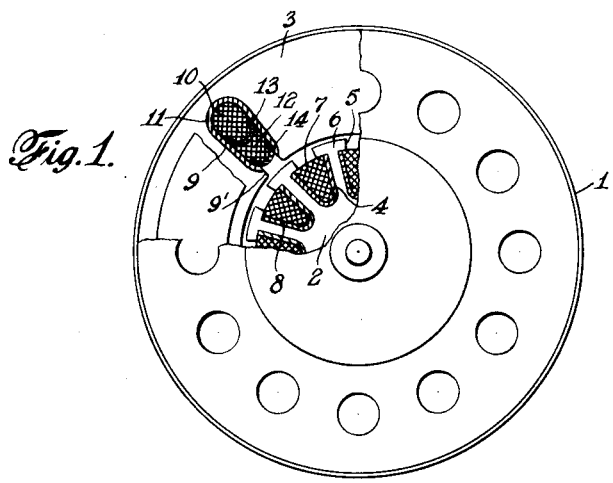
Figure 1 is an end elevation, partly in section, of a motor embodying the principles of the instant invention and showing the insulation of the windings from the armature core and the insulation of the stator coils and the exciter coils from the stator core.

In one embodiment of this invention, the armature slots and the stator slots of a motor are lined with an insulating material, more fully hereafter explained, in order to insulate the windings and coils from the armature core and the stator core respectively.

In a compound-wound machine having a starting winding (exciter coil) and a run winding (stator coil), the instant invention also contemplates insulating said starting winding from said run winding as well as insulating said windings from the stator.

The insulating material above referred to and contemplated by the instant invention is a laminated material of appropriate dimensions (depending on the place where it is to be used) and having a high voltage resistance, high strength, resistance to water (waterproof), etc. In the preferred embodiment of the invention, the insulating material consists essentially of three coextensive plies or laminae adhesively secured together. Paper, bleached or not as desired, and consisting essentially of half rag and half sulphite fibers, with or without a pigment and with or without fillers, modifying ingredients, etc., constitutes the inner ply. Each of the outer plies consists essentially of a cellulose derivative and specifically cellulose acetate. Though the outer plies may be free of softeners or plasticizers, I prefer to use cellulose acetate containing a sufficient quantity of a plasticizer to impart thereto the desired degree of softness, plasticity and flexibility. Satisfactory results have been secured when dibutyl phthalate constitutes the plasticizer and is present in an amount of approximately 30%, by weight, based on the cellulose acetate.

For some purposes, it is not necessary to employ the three-ply material above described. In many instances, a two-ply material gives the desired results. This two-ply material consists of a ply of paper (of the type above described) adhesively secured to a ply of cellulose acetate, also above described. In other words, the ply of cellulose acetate is secured to one side only of the paper.

In producing the insulating material, a web of paper and coextensive sheets or films of cellulose acetate are laminated together, and thereafter the resulting product is cut and slit into pieces of the desired dimensions (length and width).

The cellulose acetate sheets or films may be laminated to the paper in any suitable way. For example, an assembly of the two or three plies arranged in the desired relationship is subjected to heat and pressure, the heat being of a temperature sufficient to render the cellulose acetate thermoplastic and the pressure sufficient to bring the contiguous surfaces of the materials into intimate relationship. Heated pressure rolls are an illustrative apparatus for carrying out this form of laminating.

An alternative procedure for laminating the cellulose acetate sheetings to the paper contemplates applying, to at least one of the surfaces of the materials which are to be in superposed contactual relationship, a solvent which will render the cellulose acetate tacky and adhesive, then superimposing the materials, and subjecting them to pressure to effect uniting of the materials. It is, of course, to be understood that in this form an excess quantity of solvent is to be avoided. In this form, the term "solvent" is intended to cover a single solvent, a solvent mixture, a swelling agent, a swelling agent mixture, etc.

In still another embodiment, the material constituting the plies of the product may be laminated together through the medium of a satisfactory adhesive. Any suitable adhesive which gives a firm bond, and which does not crack or loosen even upon flexing or bending of the product, may be employed. As specific illustrative examples of adhesives which have given satisfactory results may be mentioned (1) A resin (either natural or synthetic) of the desired softness;

(2) A resin (either natural or synthetic) and a softener;

(3) Either of the adhesives, defined in (1) and (2), but also containing a cellulose derivative, such as cellulose nitrate, cellulose acetate, cellulose ether, etc.

The aforementioned adhesives are of the thermoplastic nature and result in a firm bond which does not crack, or break, or loosen, even when the material is flexed or bent.

In some cases, it may be desirable to utilize an adhesive of a lesser viscosity than that of the aforementioned adhesives. The viscosity of the adhesive may be controlled by the incorporation therein of the desired amount of solvent.

In the event the moisture content of the paper is higher than desirable, it may be reduced in any convenient manner.

To show the properties of the insulating material there is hereafter set forth a comparative table showing the properties of (1) The paper per se;

(2) The two-ply material, i. e. paper having cellulose acetate laminated to one side thereof; and (3) The three-ply material, i. e. paper having cellulose acetate laminated to each side thereof.

panying drawing showing an illustrative embodiment of the invention and wherein like reference numerals designate like parts and wherein the reference numeral 1 designates a dynamo-electric machine, such as a compound-wound machine, containing an armature core 2 and a stator 3. The armature core is preferably of the laminated type and is provided with a plurality of spaced slots 4 in the outer periphery thereof. The slots 4 are so formed that the projecting edges 5 of the spaced segments 6 of the core 2 constitute lips. An insulated wire is wound into the slots 4 depending on the nature of the windings desired, and said windings constitute the armature windings 7.

The coils of the windings 7 are insulated from each other in the usual manner by having an insulated cover thereon. In order to insulate the windings 7 from the core 2, each slot is lined with an insulating material 8, hereinafter more fully described.

The stator 3 is preferably also built up of soft steel laminations and is provided with stator slots 9 on the inner periphery thereof, having lips 9', and in which slots the stator coils 10 are positioned. The run winding or stator coils 10 are formed of insulated wire whereby they are insulated from each other. The stator coils 10 are insulated from the stator 3, in accordance Maxite .0135—coated with cellulose acetate 55% relative humidity at 72° F.

| Material | Thickness | Weight | Tensile | | | | Mullen | Total volts | Volts per mil products | Moisture |
|---|---|---|---|---|---|---|---|---|---|---|
| | | | Length | | Cross | | | | | |
| | | | Tensile strength | Elongation | Tensile strength | Elongation | | | | |
| | | | | Percent | | Percent | | | | Percent |
| 1 | .0135 | 282.6 | 142 | 2.2 | 80 | 5.8 | 205 | 2,800 | 193 | 6.1 |
| 2 | .0151 | 307.8 | 166 | 3.3 | 86 | 6.6 | 234 | 4,300 | 285 | 6.4 |
| 3 | .0168 | 345.6 | 176 | 3.6 | 102 | 6.8 | 300 | 8,300 | 494 | 5.7 |

The following are explanations of the captions in the above table:

Thickness is in inches.

Weight is in pounds per M square inches.

Tensile strength is in pounds per square inch as determined on the Shopper testing machine.

Elongation is the percent of stretch.

Mullen is bursting strength per square inch as determined on a Mullen tester.

Total volts is the number of volts the material will stand before puncturing.

Volts per mil product is the number of volts the material stands per .001".

Moisture % is the percentage of moisture in the material.

From the above table, it is apparent that the products contemplated by this invention have a relatively high voltage resistance, and that the increase in voltage resistance of the product contemplated by the instant invention over that of the paper per se is indeed most surprising. The insulating material of the instant invention is waterproof. It is flexible and possesses an inherent high degree of resiliency. Thus, the material may be flexed and, due to the inherent resiliency thereof, it will seek to return to its normal position a property which is highly important as will hereafter appear.

Best results are obtained in motors varying from $\frac{1}{16}$ to 5 horsepower and wherein the temperature does not exceed 200° F.

In order to more fully explain the instant invention, reference will now be made to the accomwith this invention, by disposing an insulating material 11 between the said stator and the said stator coils.

In the form shown, the stator 3 is also provided with a starting winding or exciter coils 12 which are also disposed in the stator slots 9 and in juxtaposition to the stator coils 10 as shown in the drawing. The exciter coils 12 are also formed of insulated wire whereby they are insulated from each other. They are insulated from the stator coils 10 by the insulating material 13 interposed therebetween. To insulate the normally exposed surfaces of the exciter coils 12, there is provided the insulation 14. The insulating material 11 insulates the stator 3 from the exciter coils 12.

Figure 2:
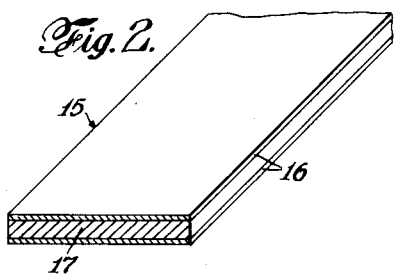
Figure 2 is an enlarged perspective view of the insulating material.

Each of the insulating elements 8, 11, 13 and 14 are formed in the preferred embodiment of the invention of a laminated material generally designated by the reference numeral 15 (see Figure 2). This laminated material 15 is formed of, in the preferred form as shown, three plies, the two outer plies 16 consisting essentially of cellulose acetate, with or without a plasticizer as previously described, and the inner ply 17 formed of paper consisting essentially of approximately half rag and half sulphite fibers, with or without a pigment, and which may have been subjected to a bleaching operation or not as desired. The plies are adhesively secured together in the manner previously described.

To make the insulator elements 8, 11, 13 and 14, the laminated material 15 is slit and cut in any appropriate manner to produce the desired size of the strip.

Figure 4:
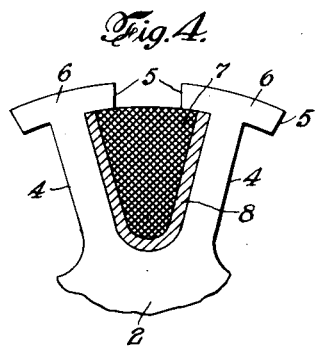
Figure 4 is an enlarged detail of an armature slot, the windings therein, and the insulation therebetween.
Figure 5:
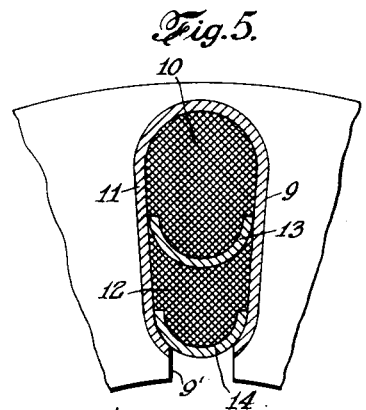
Figure 5 is an enlarged detail of the stator slot and the coils therein and the insulation therebetween.

As is clearly shown in Figures 1 and 4, the insulating element 8 is positioned intermediate the core 2 and the windings 7 in each slot 4. In other words, the insulating element 8 lines the respective slot. To insert the insulating element 8 in position, it is bent in substantially U or V-shape and is inserted into position in the slot 4.

Due to the inherent resiliency of the material 15 from which the insulating element 8 is made, the legs 18 of the bent element 8 tend to expand outwardly and assume the normal flat condition, with the consequence that the legs 18 exert a pressure on the walls of the slot 4, thereby substantially locking the insulation material 8 in position. The insulator also generally conforms to the shape of the slot in which it is disposed. It is to be noted that the transverse edges of the legs 18 are beneath and cooperate with the lips 5.

Figure 3:
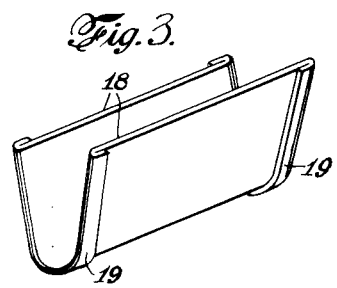
Figure 3 is a perspective view of one form of the insulating material as used.

The ends of the legs 18 in the embodiment immediately before described are cut edges. If desired, the cut edges may be folded rearwardly onto the body of the material. Such an embodiment is shown in Figure 3. The reference numeral 19 therein designates the folds obtained when the cut edges are folded backwardly and lapped over onto the body.

The insulation 11 employed in the stator slots 9 may be similar in form and construction to the insulation 8 above described.

The insulation 13 as shown in the drawing, insulates the stator coils 10 from the exciter coils 12. Though shown as arched, the insulation 13 may be of any other configuration. It usually takes the form of the exterior surface of the windings 10 with which it is in contact.

The insulation 14 is substantially of the same shape and form as the insulation 13. It is kept in position by its inherent resiliency and also the lips 9' of the slot 9.

The insulation hereinbefore described is not restricted to any specific type of dynamo-electric machine. It may be used in A. C. or D. C. motors. It may be used in motors having rotating or stationary fields and it may be used irrespective of the nature and type of armature windings, stator coils or exciter coils. It may be used for electrical insulation for any purpose whatsoever.

Since it is obvious that various changes and modifications may be made in the above description without departing from the nature or spirit thereof, this invention is not restricted thereto except as set forth in the appended claims.

I claim:

1. In a dynamo-electric machine having a core and windings, a resilient laminated material insulating said core from said windings, said laminated material having at least two coextensive plies thermoplastically secured together, one of said plies being formed of paper consisting essentially of rag and sulphite fibers and the other of cellulose acetate.

2. In a dynamo-electric machine having a core and windings, a resilient laminated material insulating said core from said windings, said laminated material having a ply of paper consisting essentially of rag and sulphite fibers interposed between two plies formed of cellulose acetate, said plies being coextensive and thermoplastically secured together.

3. In a dynamo-electric machine having a slotted core and windings in the slots, a laminated material disposed intermediate the core and the windings to insulate said core from said windings, said laminated material having a ply of paper consisting essentially of rag and sulphite fibers thermoplastically secured to a coextensive ply formed of cellulose acetate, said laminated material having a high degree of inherent resiliency and bent in a substantially U or V shape, the bent material being locked in position and made to generally conform to the shape of the slot by the pressure of the legs of the bent material exerted on the walls of said slot.

4. In a dynamo-electric machine having a slotted core and windings in the slots, a laminated material disposed intermediate the core and the windings to insulate said core from said windings, said laminated material having a ply of paper consisting essentially of rag and sulphite fibers thermoplastically secured between coextensive plies formed of cellulose acetate, said laminated material having a high degree of inherent resiliency and bent in a substantially U or V shape, the bent material being locked in position and made to generally conform to the shape of the slot by the pressure of the legs of the bent material exerted on the walls of said slot.

5. An insulating material, suitable for insulating slot cells from windings therein in dynamo-electric machines, comprising a resilient laminated material having at least two coextensive plies thermoplastically secured together, one of said plies being formed of paper consisting essentially of rag and sulphite fibers and the other formed of cellulose acetate.

6. An insulating material, suitable for insulating slot cells from windings therein in dynamo-electric machines, comprising a resilient laminated material having a ply of paper consisting essentially of rag and sulphite fibers and interposed intermediate and thermoplastically secured to two plies of cellulose acetate.

KARL E. PRINDLE.